(12) United States Patent
Guillouet et al.

(10) Patent No.: US 9,804,283 B2
(45) Date of Patent: Oct. 31, 2017

(54) VIBRO SEISMIC SOURCE SEPARATION AND ACQUISITION

(71) Applicant: CGG SERVICES SA, Massy (FR)

(72) Inventors: Matthieu Guillouet, Paris (FR); Olivier Winter, Houston, TX (US); Thomas Bianchi, Paris (FR)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 14/897,002

(22) PCT Filed: Jun. 26, 2014

(86) PCT No.: PCT/EP2014/063600
§ 371 (c)(1),
(2) Date: Dec. 9, 2015

(87) PCT Pub. No.: WO2014/207148
PCT Pub. Date: Dec. 31, 2014

(65) Prior Publication Data
US 2016/0154131 A1    Jun. 2, 2016

Related U.S. Application Data

(60) Provisional application No. 61/840,824, filed on Jun. 28, 2013, provisional application No. 61/840,810, filed on Jun. 28, 2013.

(51) Int. Cl.
*G01V 1/37* (2006.01)
*G01V 1/00* (2006.01)

(52) U.S. Cl.
CPC .............. *G01V 1/375* (2013.01); *G01V 1/005* (2013.01); *G01V 2210/50* (2013.01)

(58) Field of Classification Search
CPC ...... G01V 1/375; G01V 1/005; G01V 2210/50
USPC ..................................................... 367/21, 41
See application file for complete search history.

(56) References Cited

U.S. PATENT DOCUMENTS

| 5,721,710 | A  | 2/1998  | Sallas et al.    |
| 7,859,945 | B2 | 12/2010 | Sallas et al.    |
| 8,248,886 | B2 | 8/2012  | Neelamani et al. |
| 8,675,447 | B2 | 3/2014  | Poole            |
| 2010/0097888 | A1 | 4/2010 | Neelamani et al. |
| 2013/0163381 | A1 | 6/2013 | Sallas           |

(Continued)

OTHER PUBLICATIONS

Vandenberghe, "3. Conjugate gradient method," lecture notes for UCLA electrical engineering department class EE236C, Spring 2016, downloaded Jan. 17, 2017 from http://www.seas.ucla.edu/~vandenbe/236C/lectures/cg.pdf, 33 pages.*

(Continued)

*Primary Examiner* — Daniel L Murphy
(74) *Attorney, Agent, or Firm* — Patent Portfolio Builders PLLC

(57) ABSTRACT

Methods and systems for separating seismic data acquired using a plurality of substantially simultaneously fired sources are described. The sources use sweep sequences having low cross correlation levels to generate seismic waves, and their source signatures are determined. Using the source signatures, the wave fields associated with each of the sources are extracted from the seismic data by, for example, performing a time domain deconvolution.

20 Claims, 6 Drawing Sheets

(56) References Cited

U.S. PATENT DOCUMENTS

2015/0241586 A1   8/2015 Winter

OTHER PUBLICATIONS

International Search Report in related International Application No. PCT/EP2014/063600, dated Oct. 22, 2014.
Written Opinion of the International Searching Authority in related International Application No. PCT/EP2014/063600, dated Oct. 22, 2014.
C. Krohn et al., "Vibroseis Productivity: Shake and Go", SEG International Exposition and 76th Annual Meeting, New Orleans, Louisiana, Oct. 1-6, 2006, pp. 42-46.
H. J. Rozemond, "Slip-Sweep Acquisition", SEG Technical Program Expanded Abstracts, 1996, pp. 64-67.
J.J. Sallas, "Seismic Vibrator Control and the Downgoing P-Wave", GEOPHYSICS, Jun. 1984, vol. 49, No. 6, pp. 732-740.
A. Tarantola, "Inverse Problem Theory and Methods for Model Parameter Estimation", Institut de Physique du Globe de Paris, 2005, Society for Industrial and Applied Mathematics.
R. Soubaras, "3D Projection Filtering for Noise Attenuation and Interpolation", SEG Technical Program Expanded Abstracts, 2000.

\* cited by examiner

Fig. 2      200
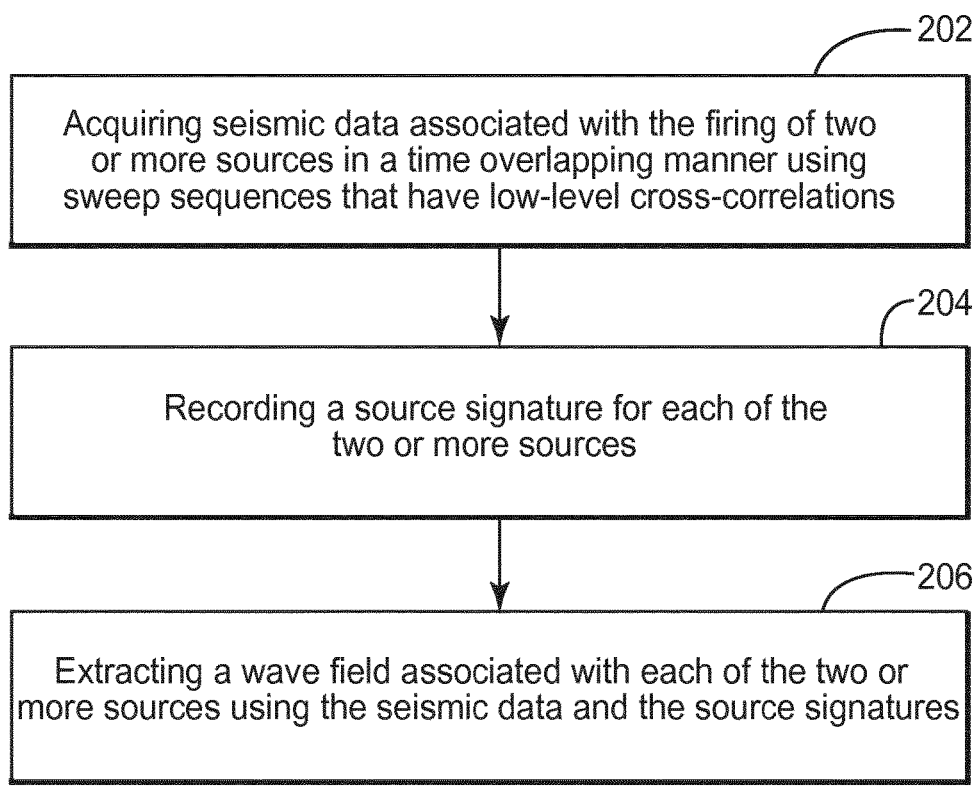

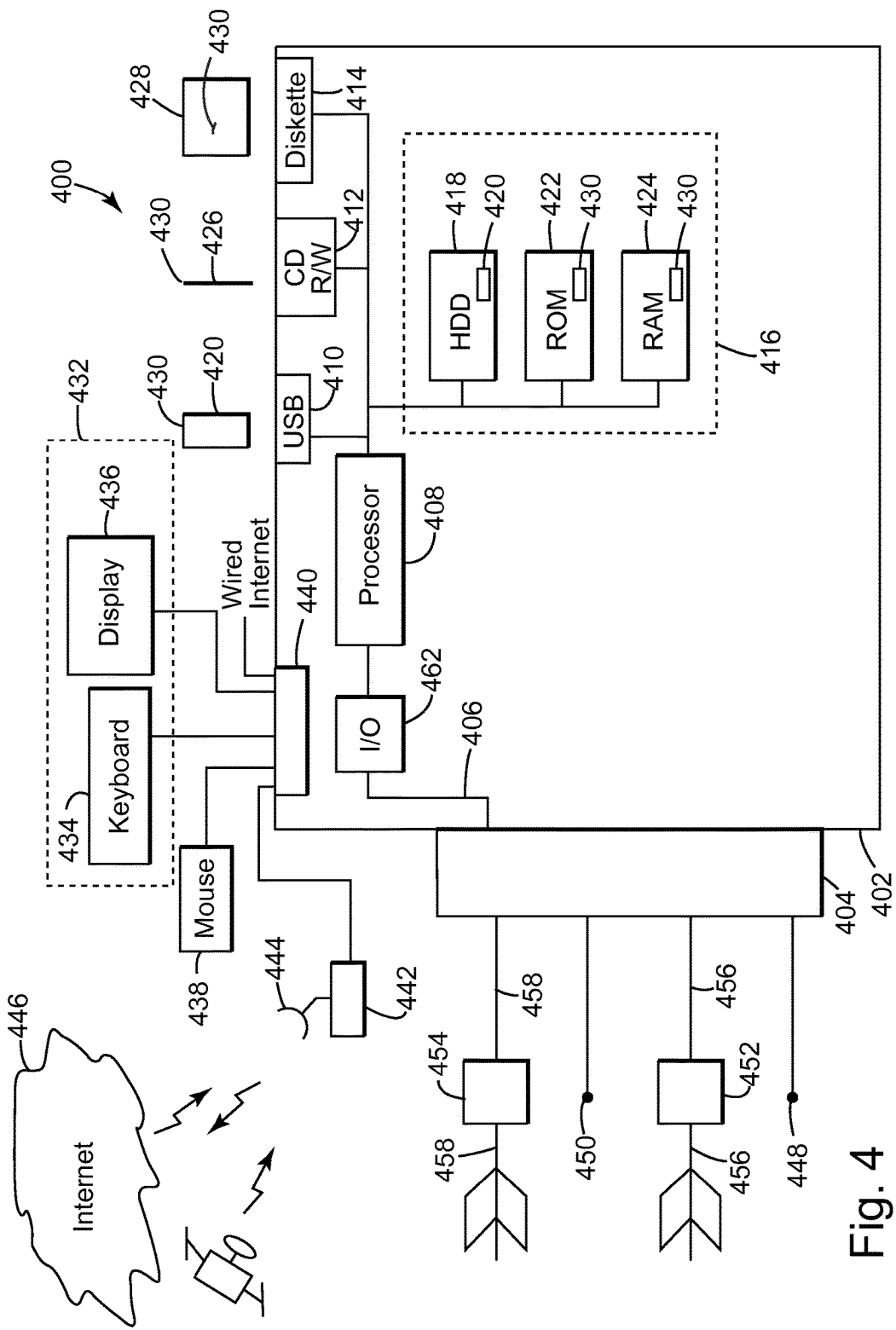

VIBRO SEISMIC SOURCE SEPARATION AND ACQUISITION

RELATED APPLICATIONS

The present application is related to, and claims priority from U.S. Provisional Patent Application No. 61/840,810, filed Jun. 28, 2013, entitled "HIGH PRODUCTIVITY VIBRO SEISMIC ACQUISITION," to Matthieu GUILLOUET, Olivier WINTER and Thomas BIANCHI, the disclosure of which is incorporated herein by reference in its entirety and from U.S. Provisional Patent Application No. 61/840,824, filed Jun. 28, 2013, entitled "VIBROSEISMIC SOURCE SEPARATION METHOD-SIMULTANEOUS TIME-DOMAIN DECONVOLUTION," to Matthieu GUILLOUET, Olivier WINTER and Thomas BIANCHI, the disclosure of which is incorporated herein by reference in its entirety.

TECHNICAL FIELD

Embodiments of the subject matter disclosed herein generally relate to methods and systems for seismic data processing and, more particularly, to mechanisms and techniques for separating sources in seismic data.

BACKGROUND

Seismic data acquisition and processing techniques are used to generate a profile (image) of a geophysical structure (subsurface) of the strata underlying the land surface or seafloor. Among other things, seismic data acquisition involves the generation of elastic waves, the collection of reflected/refracted versions of those elastic waves and processing to generate the image. This image does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process in the field of seismic surveying.

The generation of seismic images from seismic surveys is a time consuming and expensive undertaking, i.e., the longer it takes to collect and process the seismic data, the greater the cost of the seismic survey. In another aspect, longer seismic survey times may have a greater environmental impact, which is a consideration when requesting permits to perform a seismic survey. Further longer seismic survey times may lead to greater hazardous exposure to individuals operating the seismic survey equipment. Accordingly, one of the ways to reduce the cost of generating seismic images, the environmental impact and the hazardous exposure is to decrease the time required to collect seismic data. Among other things, this can be accomplished by firing multiple seismic sources simultaneously or in a time overlapping manner to reduce the time needed to collect seismic data. However when firing multiple sources simultaneously or in a time overlapping manner, it then becomes necessary to reassign the received elastic wave energy to its originating source by separating the sources during processing of the data.

In order to provide some context for the subsequent embodiments for separating sources, consider a data acquisition process and system as will now be described with respect to FIG. 1. FIG. 1 shows a system 100 for the land-based acquisition of seismic data. The system 100 includes a plurality of receivers 102 positioned over an area 104 of a subsurface to be explored and in contact with the surface 106 of the ground. A number of sources 108 are also placed on the surface 106 in an area 110, in a vicinity of the area 104 of the receivers 102. A recording device 112 is connected to the plurality of receivers 102 and placed, for example, in a station/truck 114. Each source 108 can be composed of a variable number of vibrators, typically between one and five, and can include a local controller 116. A central controller 118 can be provided to coordinate the shooting times of the sources 108. A GPS system 120 can be used to time-correlate the sources 108 and the receivers 102. With this configuration, sources 108 are controlled to generate seismic waves, and the plurality of receivers 102 records waves reflected by the oil and/or gas reservoirs and other structures in the subsurface.

Considering conventional approaches to reduce the time required to generate seismic images using systems like that illustrated in FIG. 1, and for at least the reasons described above, groups of seismic sources 108 are often fired in overlapping (in time) patterns creating blended signals for recording by the receivers 102. Subsequent processing of the recorded seismic data separates the sources such that the sources appear to have been fired sequentially, however in order to perform this separation processing the overlapped firings may require the use of sources with different frequency characteristics or predefined spatial and/or temporal separation between the source firings. Additionally, factors associated with the local sample area can impact the required source firing separation parameters described above and the source separation strategies, sensitive to signal distortion, can fail to achieve the desired level of separation.

Accordingly, it would be desirable to provide systems and methods that avoid the afore-described problems of separating overlapped source firings without requiring complex firing schedules and layouts and which provide a shorter period of time for conducting a seismic survey.

SUMMARY

As described above, it would be desirable to provide systems and methods that avoid the afore-described problems of separating time overlapped source firings without requiring complex firing schedules and layouts and/or which provide a shorter period of time for conducting a seismic survey. This can be achieved by, for example, a combination of careful selection of the sweep sequences used to generate the seismic energy of each shot, recording source signature information and data processing techniques for separating the wave fields (data) associated with each of the time-overlapping shots.

According to an embodiment, a method, for separating seismic data, includes the steps of acquiring seismic data associated with the firing of two or more sources in a time overlapping manner using sweep sequences that have low-level cross-correlations, recording a source signature for each of the two or more sources, and extracting a wave field associated with each of the two or more sources using the seismic data and the source signatures.

According to another embodiment, a system for processing seismic includes at least one processor which is configured to receive recorded seismic data associated with the firing of two or more sources in a time overlapping manner using sweep sequences that have low-level cross-correlations and a source signature for each of the two or more sources; and wherein the at least one processor is further configured to extract a wave field associated with each of the two or more sources using the seismic data and the source signatures.

According to another embodiment, a non-transitory computer-readable medium, having program instructions stored thereon which, when executed by a suitably programmed computing device, performs the steps of: acquiring seismic data associated with the firing of two or more sources in a time overlapping manner using sweep sequences that have low-level cross-correlations; recording a source signature for each of the two or more sources; and extracting a wave field associated with each of the two or more sources using the seismic data and the source signatures.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 2 is a flowchart of a method for separating seismic data according to an embodiment;

FIG. 4 is a system in which methods according to embodiments can be implemented.

DETAILED DESCRIPTION

Figure 1:
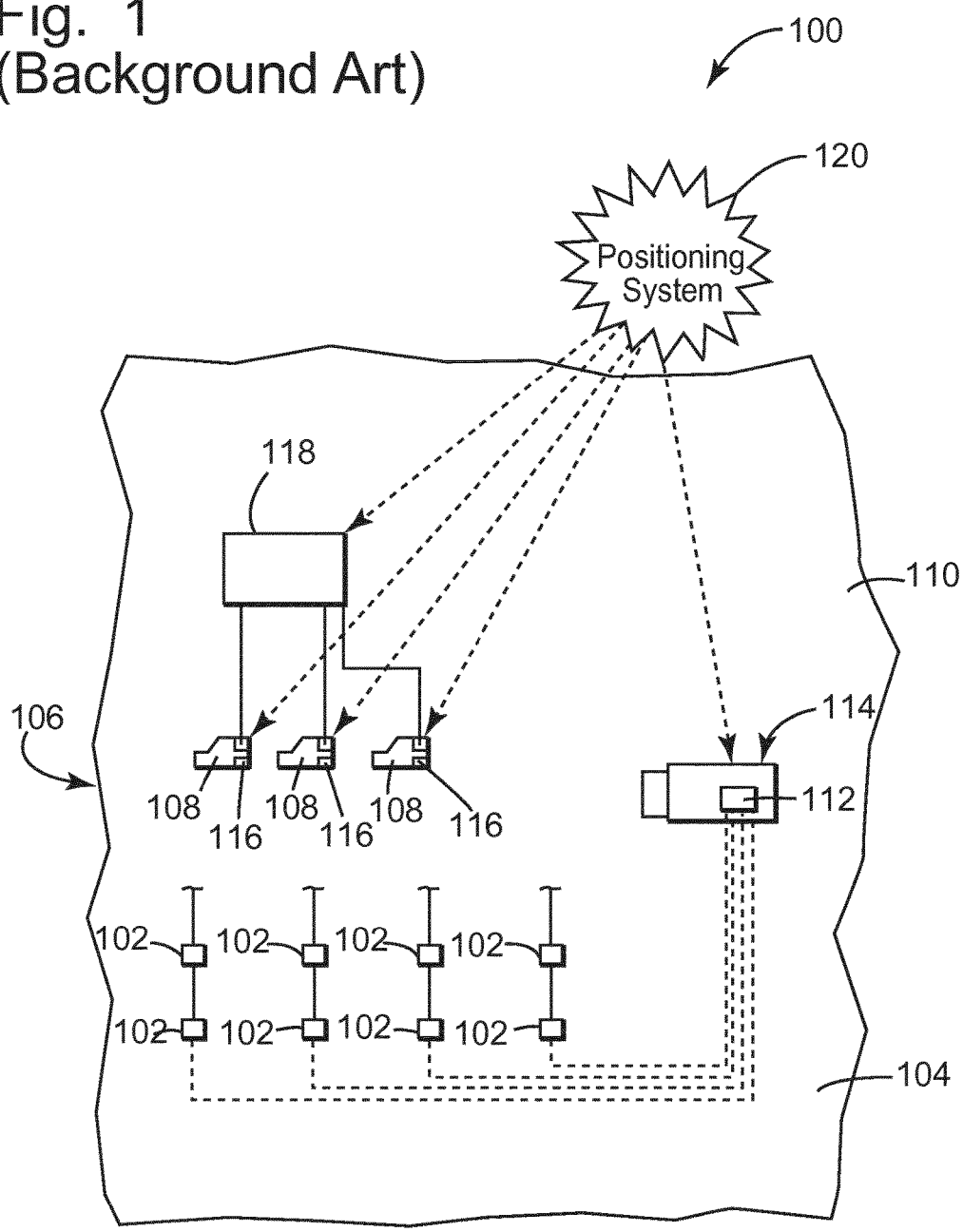
FIG. 1 shows various aspects of an onshore seismic data acquisition system.

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of source separation associated with seismic surveys. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The following embodiments describe, among other things, methods and systems configured to acquire seismic wave fields from several vibratory sources simultaneously and processing techniques for separating each of the individual wave fields which have been acquired. A general method embodiment 200 is illustrated in the flowchart of FIG. 2.

Therein, at step 202, the seismic data is acquired by firing two or more sources in a time overlapping manner, e.g., simultaneously or substantially simultaneously, using sweep sequences that provide low-level cross-correlations. The source signatures are recorded at step 204 and then each of the wave fields associated with the two or more sources are extracted (separated) from the seismic data using the source signatures at step 206. Each of these steps 202, 204 and 206 will now be described in more detail.

Starting with step 202, there are several ways to generate sweep sequences having low level cross correlations that are suitable for use in these embodiments. As will be appreciated by those skilled in the art, sweep sequences are functions that are used to drive the vibrators which operate as the sources 108 in a seismic acquisition system. In this context, and according to some embodiments, sweep sequences having "low-level cross-correlations" refer to those sweep sequences having a ratio between a maximum of the autocorrelation of the sequence and a mean level of cross-correlation between that sequence and the other sequences being used in the substantially simultaneous shots which is less than a predetermined threshold value, i.e.:

$$\text{Max[autocorrelation]/Mean[cross-correlation]} < \text{Threshold} \quad (1)$$

Illustrations of exemplary cross-correlation and autocorrelation functions associated with suitable sweep sequence functions are described below with respect to FIGS. 3(a)-3(f). The threshold which is selected for equation (1) will vary from implementation to implementation based upon the condition number associated primarily with the density of the shots used in the seismic acquisition and the cross-correlation of the different signatures involved (generally much more than two signatures). As will be appreciated by those skilled in the art, the so-called condition number is a characteristic of the seismic data matrix to be inverted, based on a ratio between the largest and smallest singular values. As a practical matter, when the condition number gets too high, the matrix becomes rank deficient and, therefore, a limit is typically set for the condition number as part of the overall seismic data processing approach.

To summarize step 202, and referring to just two sources and signatures to simplify the example, if two sources are fired simultaneously or substantially simultaneously, then one of the sources can use a first sweep sequence to vibrate the ground and the other one of the sources can use a second sweep sequence to vibrate the ground, wherein the first and second sweep sequences are different from one another and have a low cross-correlation relative to one another as described above with respect to equation (1). This can be extended to any number of desired simultaneous shots and signatures and this property aids in the subsequent step of differentiating the sources which generated the received acoustic waves in the extracting step 206 which is described in more detail below.

There are a number of different types of sweep sequences which are sufficiently low in their cross-correlation values that render them suitable for use in these embodiments including, for example, sine-wave sweeps having time and/or phase separation or random sweep sequences. By way of contrast, and merely as an example, synchronized conventional sweeps with no phase rotation, or conventional sweeps with a slip-time smaller than the listen time, will not typically be suitable choices for these embodiments, e.g., a sweep with a linear sweep rate of 3-90 Hz. Some more specific examples of suitable sweep sequences will now be discussed.

Figure 3A:
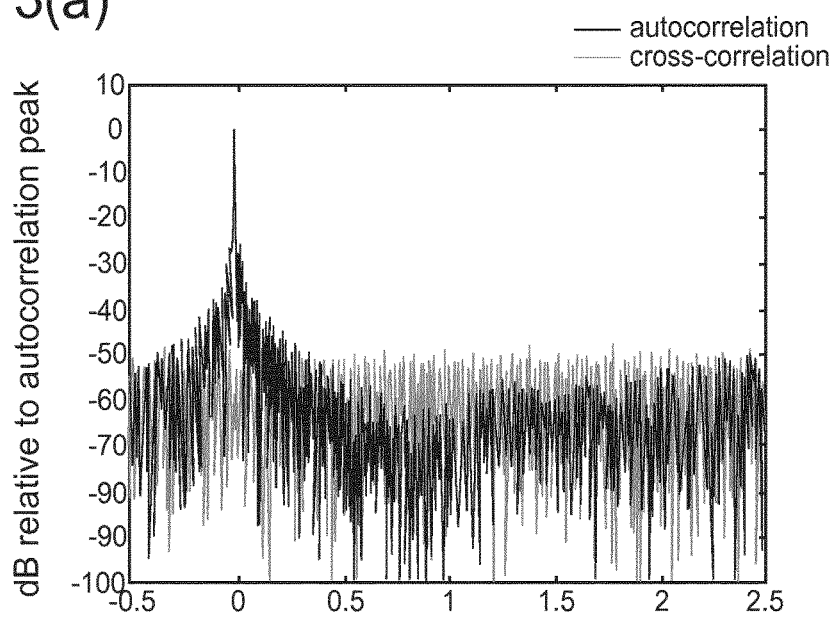
FIGS. 3(a)-3(f) illustrate cross-correlation functions between different types of sweep sequences, and representative autocorrelation functions for the sweep sequences, which sequences are designed to have low level cross-correlation values according to an embodiment.

Starting first with the category of sweep sequences based on sine wave functions, the so-called "slip-sweep" sequence described by, for example, Rozemond in the article "Slip-sweep acquisition", published in SEG Expanded Abstracts 15, 64 (1996) is one such sweep sequence that can be used in an embodiment to generate the transmitted seismic or acoustic waves for the acquisition. As will be apparent to those skilled in the art, when using slip-sweep sequences as the functions used as inputs to the vibrators, the vibrators all use the same sweep, but there is a minimum time delay constraint between two consecutive sweeps, this delay being the "slip-time". The slip-time exceeds the listening time, and in this case the cross-correlation of consecutive signals contains only harmonic interference, usually 20 dB down from the fundamental sweep frequency. An example of the low cross-correlation between two slip sweep sequences is shown in FIG. 3(a), along with the autocorrelation of a representative one of those two sequences (which autocorrelations typically have the same shape and relevant amplitudes such that only one is illustrated in each of FIGS. 3(a)-3(f)).

Another type of sine-wave sweep which can be used in the embodiments is those which use synchronized phase rotations, e.g., high fidelity vibratory seismic (HFVS) as described by, for example, Allen, K. P., Corrigan D., and Sallas, in their U.S. Pat. No. 5,721,710, entitled "High fidelity vibratory source seismic method with source separation", the disclosure of which is incorporated here by reference, or by Krohn, C., Johnson, M., Norris, M., and Ho, R. in their article "Vibroseis Productivity: Shake and Go", published in SEG Technical Program Expanded Abstracts 2006, 42-46. When employing HFVS, several source units shake several sweeps on the same spot, in a synchronized way. Each sweep is separated by a listen time. The number of experiments (sweeps) is designed to match or exceed the number of individual wave fields to be extracted (number of units). Each sweep segment is de-phased according to a well-conditioned, phase rotation matrix.

Figure 3B:
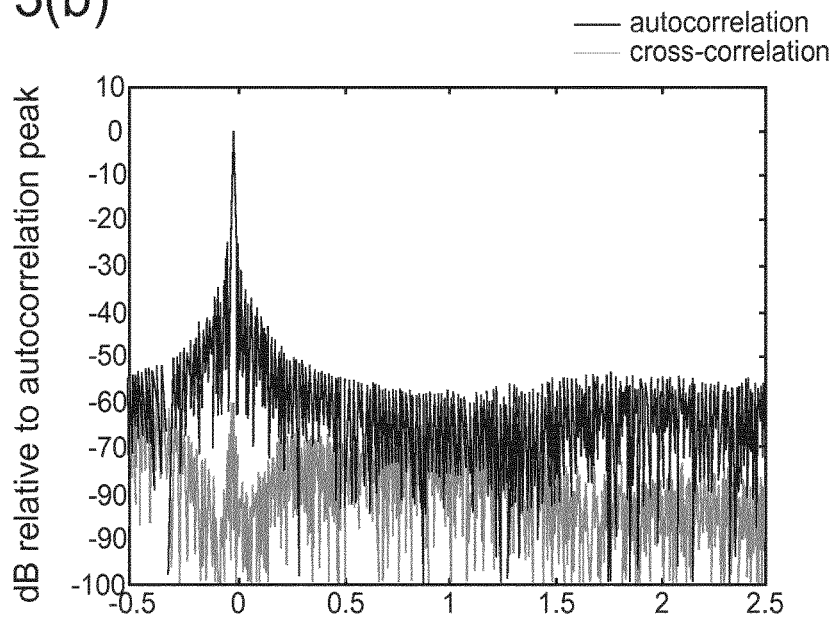

Phase rotated sweep sequences can, for some embodiments, make excellent choices for the low-level cross correlation sweep sequences used in the substantially simultaneous shots. Although they can be designed to have zero (or very low) cross-correlation values, harmonic distortion will not honor the phase rotation scheme and creates cross-talk. An example of this is shown in FIG. 3(b) where two phase rotated sine wave sweep sequences are cross-correlated. Time and/or phase separation of sweeps can, for example, be implemented using different techniques such as using a GPS clock with a controller system or receiving signals from a central command truck to initiate start and stop sequences.

Figure 3C:
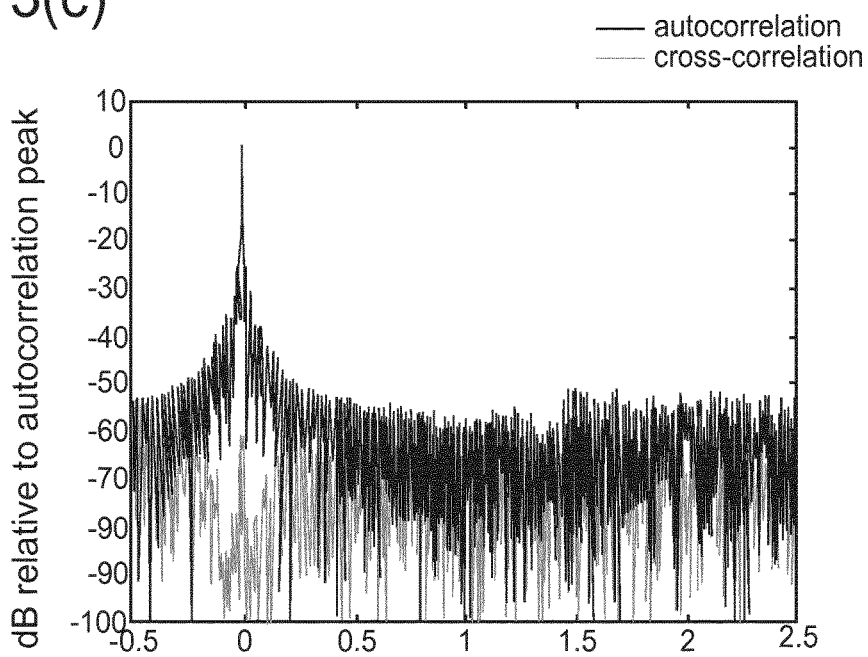

Another category of sine-wave sweeps which can be used in these embodiments is synchronized phase rotations without listening time, also sometimes referred to as C-HFVS and also described in the above-identified article to Krohn et al. Similar to HFVS sweep sequences, but without listening time, using this type of sweep sequence has the side-effect that harmonic noise leaks from one rotation to the previous rotation, the same phenomenon being observed when slip-sweep sequences are used. An example of the low cross-correlation between two phase rotated sine wave sweep sequences without listening time, and a representative autocorrelation function, is shown in FIG. 3(c).

Figure 3D:
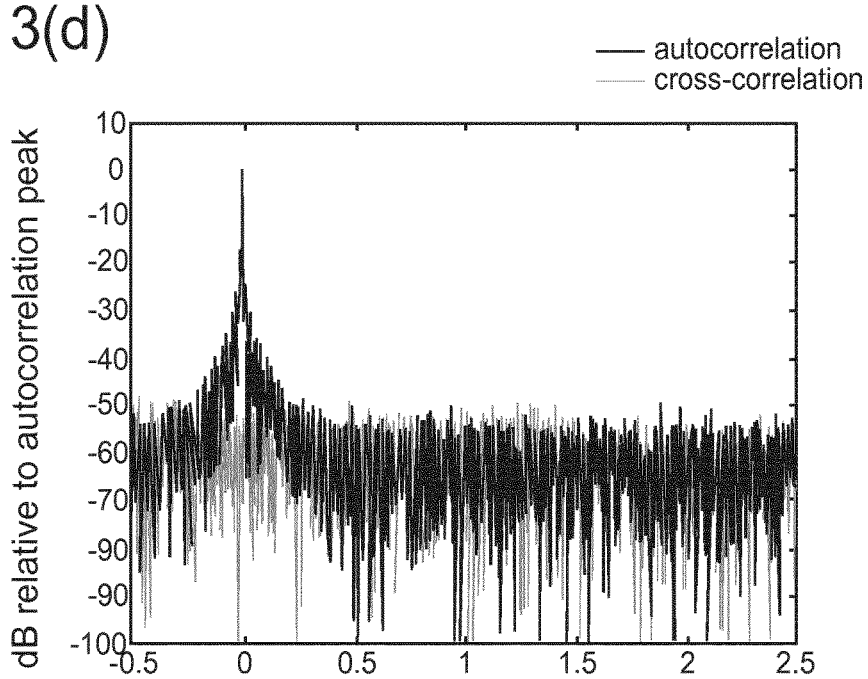

One other category of sine-wave sweep sequences which can be used in these embodiments is those which have un-synchronized phase rotations wherein each vibrator unit shakes its rotations independently of the others, with or without listening time. In one embodiment there is no constraint on the un-synchronized phase rotations between sweep sequences used to fire the simultaneous or substantially simultaneous sources, but certain time differences may then result in a cross-correlation peak that may have to be addressed by regularization. In a practical implementation of an embodiment, one can first perform an inversion of the seismic data acquired using these techniques, analyze the inversion to determine whether there exists a need for any regularization due to excessive cross-correlation peaks, and then perform another inversion applying the chosen regularization. In another embodiment, the time delay between vibrator units is locked on to a multiple of the rotation length. Then, for each shot, the sequence used may or not depend on the GPS time of the sequence start. An example of the low cross-correlation between two sine wave sweep sequences with unsynchronized phase rotations, and a representative autocorrelation function, is shown in FIG. 3(d).

One potential drawback of all these phase rotated sequences is that the number of rotations should match or exceed the number of sources, while the length of the rotation should match or exceed the listen-time. The sweep length thus may become impractical for more than 5 or 6 sources.

Figure 3E:
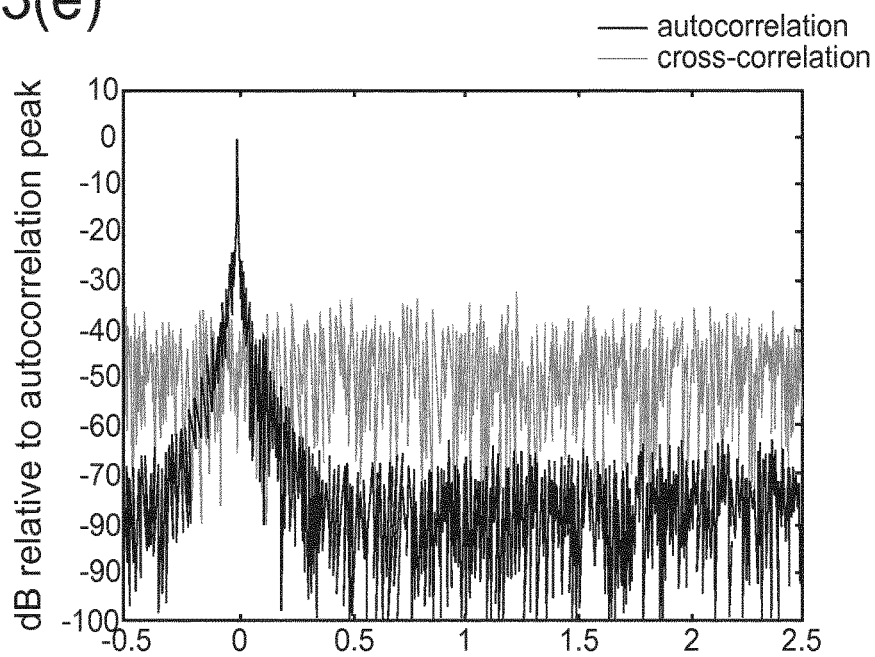
Figure 3F:
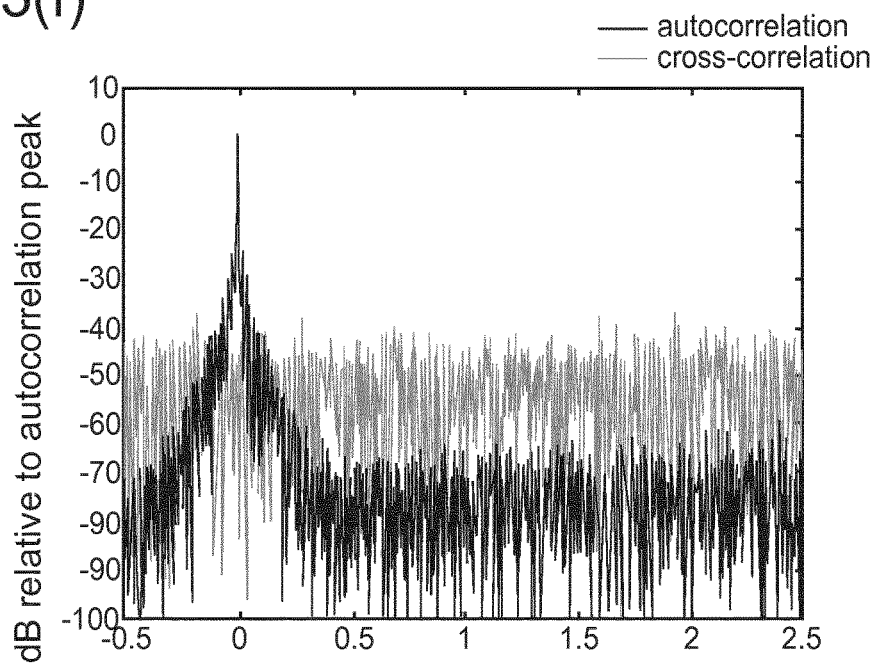

In addition to the afore-described sine-wave based sweeps sequences, random-sweep techniques may also be used in some embodiments as part of step 202 since distinct random sequences will de-correlate regardless of the delay (if any) between consecutive shots. An example of the low cross-correlation between two random sweep sequences, and a representative autocorrelation function, is shown in FIG. 3(e). As another example, some embodiments can use so-called Geneseis sequences which are specifically designed random sequences that de-correlate over the listening time. These random sweep sequences can be used at the expense of flexibility, as they require synchronization which feature of such sequences is described by, for example, U.S. Pat. No. 7,859,945 to Gibson, J., and Sallas, J, and entitled "Efficient seismic data acquisition with source separation", the disclosure of which is incorporated here by reference. An example of the low cross-correlation between two Geneseis sweep sequences, and a representative autocorrelation function, is shown in FIG. 3(f).

Alternatively, sweep sequences can be generated and used based on subsections of longer Geneseis sequences, where any unsynchronized continuous subsections decorrelate over the listening time. The part of the subsection is selected for use depending on a common time reference, for example GPS time. This alternative offers the flexibility of de-synchronization, as described, for example, in U.S. Published Patent Application No. 2013/0163381 to Sallas, J, entitled "Method and Seismic Sources with High Productivity", the disclosure of which is also incorporated here by reference.

Regardless of which low cross-correlation sweep sequences are used at step 202 to propagate acoustic waves downwardly into the subsurface to be imaged by the multiple sources which are being fired simultaneously or substantially simultaneously, the embodiments also provide for recording the source signatures associated with each of the shots at step 204. As will be appreciated by those skilled in the art, the phrase "source signature" refers to one or more parameters or functions which characterize a particular a source's emitted energy. For example, and without limitation, a seismic source signature can be a function of amplitude (e.g., pressure variation) versus time. The signal caused by a seismic wave characterized by a seismic source signature is a convolution of the explored underground structure's response and the seismic source signature. This signal is included in the amplitudes (e.g., pressure or displacement) detected in time by seismic receivers, which generate seismic data.

Since the subsequent processing performed in step 206 to isolate each wave field associated with the plural sources requires the knowledge of the source signal emitted, the source signatures are obtained at step 204. Different signals can be used as the source signatures obtained in step 204. For example, but without limitation, the following types of signals and/or measurements can be used as the source signatures: the original sweep sequence used by the source, a near-field measurement of the energy emitted by the source, and/or a measurement of the source actuator motion or pressure. According to another embodiment, the source signature of each of the sources who shots were fired simultaneously or substantially simultaneously can be determined based on a weighted sum of accelerometers which are located on the vibrator plate and the vibrator mass to generate an estimation of the ground-force of the source as described, for example, in the article to Sallas, J., entitled "Seismic vibrator control and the downgoing P-wave", published in GEOPHYSICS 1984 49:6, 732-740, the disclosure of which is incorporated herein by reference. Additionally, while it is important to know with precision the source signature associated with each shot, e.g., by the recorded weighted sum, it is also important to accurately know the associated time of the signal emission (i.e., the time of the beginning of the of each shot, referred to as the "time-break" in seismic jargon). Thus, the time series are precisely dated relative to the receiver data 102; e.g., to within 20 microseconds.

Upon determining or measuring the source signatures, and having received seismic data in response to the generation of seismic waves using the simultaneous source firings based on the low cross-correlation sweep sequences, the method 200 moves on to step 206 wherein the wave fields associated with each of the sources are extracted from the acquired seismic data. This can be accomplished by, for example, using the acquired seismic data and the source signatures to solve a multi-source convolution model as will now be described.

The convolution model used in step 206 according to an embodiment assumes that the signal received by the receivers 102 is the convolution of the source signature S(t) with the wave-field E(t) with the addition of noise S(t), as expressed by:

$$R(t)=E(t)*S(t)+N(t) \quad (2)$$

In the presence of multiple sources, the received signal is the sum of the convolutions of each source signature k with its associated wave field, in the presence of noise as expressed by:

$$R(t)=\Sigma_{k=0}{}^n E_k(t)*S_k(t)+N(t) \quad (3)$$

This equation can be solved in either the time-domain or the frequency domain.

In the time domain this equation is a large system of linear equations to solve in the presence of noise as generally represented by:

$$Se=r \quad (4)$$

where r is the continuous seismic trace, S is the multiple source convolution operator and e is the vector containing the searched wave-fields. To solve the equation one can apply a minimization of the square root of the error approach, i.e., by finding $e_b$ such that $e_b=\mathrm{argmin}(\|Se-r\|^2)$. Then, the minimum of the square root of the error is obtained using a closed form called the normal equation, i.e.:

$$S^T S e = S^T r \quad (5)$$

By using the formulation of equation (5), it becomes apparent that non-diagonal terms of the matrix $S^T S$ are in fact cross-correlations of signatures while the autocorrelation peak is the diagonal term. A strong autocorrelation with weak cross-correlation will thus provide well-conditioned matrices, which outlines the importance of properly choosing the sweep sequence.

In one embodiment, this system of equations can be solved using the conjugate-gradient algorithm, e.g., as described in a book authored by Tarantola, A., entitled "Inverse Problem Theory and Methods for Model Parameter Estimation, 2005, ISBN-10: 0898715725, since $S^T S$ is a symmetric matrix. The number of iterations needed to reconstruct the wave fields depends on two main parameters: the level of blending acquisition and the nature of the source signatures. Once the algorithm has converged the vector e contains the wave-fields of interest. Two advantages of using this technique to extract the wave fields associated with the different sources are that the reconstruction of all the wave fields is done in one inversion and the computation time is a linear function of the number of shots. However those skilled in the art will appreciate that techniques other than the conjugate-gradient algorithm can be used to solve this set of equations, e.g., Singular Value Decomposition (SVD) or Principal Component Analysis (PCA).

In addition to the steps illustrated in FIG. 2, it may also be advantageous to perform one or more other, optional, steps to process the received seismic data, either before, after or both before and after, extracting the wave fields as described above. Generally speaking, these optional step(s) can be categorized as data conditioning and/or regularization, which may be employed to de-noise the data. Some examples of such data conditioning processes or steps include, but are not limited to, despiking, random sweep noise attenuation such as that described in U.S. patent application Ser. No. 14/187,921 to Winter, O., filed on Feb. 24, 2014 and entitled "Systems and Methods for Pre-Correlation Noise Attenuation Using Random Sweeps in Seismic Data Processing", the disclosure of which is incorporated here by reference, and the use of coherency filters in the receiver domain (as, for example, described in an article to Soubaras, R., entitled "3D Projection Filtering for Noise Attenuation and Interpolation, published in SEG Expanded Abstract, pp. 2096-2099 (2000).

In the context of data regularization, such optional processing step(s) can include, for example, the muting of continuous data areas that do not contain reflectivity given first break velocity. As another example so-called Tikhonov-like regularization can be performed, e.g., a compensation based on a local analysis of the noise generated as, for example, generally described in a book authored by Aster R., Borchers B., and Thurber C., entitled "Parameter Estimation and Inverse Problems", published by Elsevier, and having ISBN 0-12-065604-3 (2005). However, the inversion-generated noise is not the same for each wave field, instead it depends on the shot configuration. Thus, according to some embodiments, a Tikhonov-like regularization is implemented by modifying the equation described above for minimizing the square root of the error to be: $e_b=\mathrm{argmin}(\|Se-r\|^2+\|We\|^2)$ with W being a diagonal matrix, such that the new normal equation (5) then becomes $(S^T S+W^T W)e=S^T r$. According to yet another embodiment, optional data regularization can be performed using coherency filters in the receiver domain such as F-X deconvolution, F-X projection, or local Tau-P transforms. See, for example, U.S. Pat. No. 8,675,447, to Poole, G., entitled "Device and Method for De-blending Simultaneous Shooting Data".

In addition to methods or processes, the embodiments can also be expressed as systems or devices which operate in the manners described above. For example, computing device(s) which operate to separate seismic data as described above may be any type of computing device capable of processing and communicating seismic data associated with a seismic survey. An example of a representative computing system capable of carrying out operations in accordance with these embodiments is illustrated in FIG. 4. System 400 includes, among other items, server 402, source/receiver interface 404, internal data/communications bus (bus) 406, processor(s) 408, universal serial bus (USB) port 410, compact disk (CD)/digital video disk (DVD) read/write (R/W) drive 412, floppy diskette drive 414 (though less used currently, many servers still include this device), and data storage unit 416.

Data storage unit 416 itself can comprise hard disk drive (HDD) 418 (these can include conventional magnetic storage media, but, as is becoming increasingly more prevalent, can include flash drive-type mass storage devices 420, among other types), ROM device(s) 422 and random access memory (RAM) devices 424. Usable with USB port 410 is flash drive device 420, and usable with CD/DVD R/W device 412 are CD/DVD disks 426 (which can be both read and write-able). Usable with diskette drive device 414 are floppy diskettes 428. Each of the memory storage devices, or the memory storage media (418, 420, 422, 424, 426, and 428, among other types), can contain parts or components, or in its entirety, executable software programming code (software) 430 that can implement part or all of the portions of the method described herein. Further, processor 408 itself can contain one or different types of memory storage devices (most probably, but not in a limiting manner, RAM memory storage media 424) that can store all or some of the components of software 430.

In addition to the above described components, system 400 also comprises user console 432, which can include keyboard 434, display 436, and mouse 438. All of these components are known to those of ordinary skill in the art, and this description includes all known and future variants of these types of devices. Display 436 can be any type of known display or presentation screen, such as liquid crystal displays (LCDs), light emitting diode displays (LEDs), plasma displays, cathode ray tubes (CRTs), among others. User console 432 can include one or more user interface mechanisms such as a mouse, keyboard, microphone, touch pad, touch screen, voice-recognition system, among other inter-active inter-communicative devices.

User console 432, and its components if separately provided, interface with server 402 via server input/output (I/O) interface 440, which can be an RS232, Ethernet, USB or other type of communications port, or can include all or some of these, and further includes any other type of communications means, presently known or further developed. System 400 can further include communications satellite/global positioning system (GPS) transceiver device 442, to which is electrically connected at least one antenna 444 (according to an embodiment, there would be at least one GPS receive-only antenna, and at least one separate satellite bi-directional communications antenna). System 400 can access internet 446, either through a hard wired connection, via I/O interface 440 directly, or wirelessly via antenna 444, and transceiver 442.

Server 402 can be coupled to other computing devices, such as those that operate or control the equipment of truck 112 of FIG. 1, via one or more networks. Server 402 may be part of a larger network configuration as in a global area network (GAN) (e.g., internet 446), which ultimately allows connection to various landlines.

According to a further embodiment, system 400, being designed for use in seismic exploration, will interface with one or more sources 448, 450 and one or more receivers 452, 454. As further previously discussed, sources 448, 450 and receivers 452, 454 can communicate with server 402 either through an electrical cable that is part of streamer 456, 458, or via a wireless system that can communicate via antenna 444 and transceiver 442 (collectively described as communications conduit 460).

According to further exemplary embodiments, user console 432 provides a means for personnel to enter commands and configuration into system 400 (e.g., via a keyboard, buttons, switches, touch screen and/or joy stick). Display device 436 can be used to show: source/receiver 456, 458 position; visual representations of acquired data; source 448, 450 and receiver 452, 454 status information; survey information; and other information important to the seismic data acquisition process. Source and receiver interface unit 404 can receive the seismic data from receiver 452, 454 though communication conduit 460 (discussed above). Source and receiver interface unit 404 can also communicate bi-directionally with sources 448, 450 through the communication conduit 460. Excitation signals, control signals, output signals and status information related to source 448, 450 can be exchanged by communication conduit 460 between system 400 and source 448, 450.

System 400 can be used to implement the methods described above associated with separating seismic data associated with different, substantially simultaneously fired sources according to an exemplary embodiment. Hardware, firmware, software or a combination thereof may be used to perform the various steps and operations described herein. According to an exemplary embodiment, software 430 for carrying out the above discussed steps can be stored and distributed on multi-media storage devices such as devices 418, 420, 422, 424, 426, and/or 428 (described above) or other form of media capable of portably storing information (e.g., universal serial bus (USB) flash drive 420). These storage media may be inserted into, and read by, devices such as the CD-ROM drive 412, the disk drive 414, among other types of software storage devices.

It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for separating seismic data, said method comprising:
    firing two or more sources in a time overlapping manner using sweep sequences that have low-level cross-correlations, wherein one of the at least two or more sources generates seismic waves using a first sweep sequence and another of the at least two or more sources generates seismic waves using a second sweep sequence, and wherein the low-level cross-correlation is defined as a ratio between (i) a maximum of an auto-correlation of one of the first sweep sequence and the second sweep sequence, and (ii) a mean level of cross-correlation between the first sweep sequence and the second sweep sequence,
    acquiring seismic data R associated with the firing of the two or more sources;
    recording a source signature $S_k$ for each of the two or more sources; and
    extracting, by applying a convolution model, a wave field $E_k$ associated with each of the two or more sources using the seismic data R and the source signatures $S_k$,
    wherein the convolution model considers that the seismic data R is a sum of convolutions of corresponding source signatures $S_k$ and wave fields $E_k$,
    a matrix S associated with the source signatures $S_k$ is a convolution operator,
    the wave fields $E_k$ are obtained by using the seismic data R and a matrix $S^T S$, which is a product of (i) a transpose $S^T$ of the matrix S and (ii) the matrix S,
    matrix $S^T S$ has non-diagonal terms that are cross-correlations of the source signatures $S_k$, and
    matrix $S^T S$ has diagonal terms that are autocorrelations of the source signatures $S_k$.

2. The method of claim 1, wherein the second sweep sequence is different than the first sweep sequence.

3. The method of claim 1, wherein a low-level cross-correlation value is less than a predetermined threshold value.

4. The method of claim 1, wherein the sweep sequences with low-level cross correlations are one of: slip sweep sequences, sine waves having synchronized phase rotations with or without listening time, sine waves having unsynchronized phase rotations and random sequences.

5. The method of claim 1, wherein the source signatures are one of: near field measurements of outputs of each of the two or more sources, measurements of the two or more sources' actuator motion or pressure, or time-stamped sweep sequences.

6. The method of claim 5, wherein the source signatures are generated using a weighted sum of outputs of accelerometers located on a vibrator plate and a vibrator mass of each of the at least two sources.

7. The method of claim 1, wherein the step of extracting further comprises:
    solving the convolution model from a continuous recording of seismic data.

8. The method of claim 7, wherein the step of extracting further comprises:
    performing a time domain deconvolution process using the acquired seismic data and the source signatures.

9. The method of claim 7, wherein the step of extracting further comprises:
    applying a conjugate-gradient algorithm to the seismic data.

10. The method of claim 9, wherein the conjugate gradient algorithm is performed in two or more iterations.

11. A system for processing seismic data, said system comprising:
    at least one processor which is configured to receive (1) recorded seismic data R associated with the firing of two or more sources in a time overlapping manner using sweep sequences that have low-level cross-correlations and (2) a source signature $S_k$ for each of the two or more sources, wherein one of the at least two or more sources generates seismic waves using a first sweep sequence and another of the at least two or more sources generates seismic waves using a second sweep sequence, and wherein the low-level cross-correlation is defined as a ratio between (i) a maximum of an auto-correlation of one of the first sweep sequence and the second sweep sequence, and (ii) a mean level of cross-correlation between the first sweep sequence and the second sweep sequence; and
    wherein the at least one processor is further configured to extract, by applying a convolution model, a wave field $E_k$ associated with each of the two or more sources using the seismic data R and the source signatures $S_k$,
    wherein the convolution model considers that the seismic data R is a sum of convolutions of corresponding source signatures $S_k$ and wave fields $E_k$,
    a matrix S associated with the source signatures $S_k$ is a convolution operator,
    the wave fields $E_k$ are obtained by using the seismic data R and a matrix $S^T S$, which is a product of (i) a transpose $S^T$ of the matrix S and (ii) the matrix S,
    matrix $S^T S$ has non-diagonal terms that are cross-correlations of the source signatures $S_k$, and
    matrix $S^T S$ has diagonal terms that are autocorrelations of the source signatures $S_k$.

12. The system of claim 11, wherein the second sweep sequence is different than the first sweep sequence.

13. The system of claim 12, wherein a low-level cross-correlation value is less than a predetermined threshold value.

14. The system of claim 11, wherein the sweep sequences with low-level cross correlations are one of: slip sweep sequences, sine waves having synchronized phase rotations with or without listening time, sine waves having unsynchronized phase rotations and random sequences.

15. The system of claim 11, wherein the source signatures are one of: near field measurements of outputs of each of the two or more sources, measurements of the two or more sources' actuator motion or pressure, or the sweep sequences.

16. The system of claim 15, wherein the source signatures are generated using a weighted sum of outputs of accelerometers located on a vibrator plate and a vibrator mass of each of the at least two sources.

17. The system of claim 11, wherein the at least one processor is further configured to extract the wave fields by solving the convolution model from a continuous recording of seismic data.

18. The system of claim 17, wherein the at least one processor is configured to extract the wave fields by performing a time domain deconvolution process using the acquired seismic data and the source signatures.

19. The system of claim 17, wherein the at least one processor is extract the wave fields by applying a conjugate-gradient algorithm to the seismic data.

20. A non-transitory computer-readable medium, having program instructions stored thereon which, when executed by a suitably programmed computing device, performs the steps of:

firing two or more sources in a time overlapping manner using sweep sequences that have low-level cross-correlations, wherein one of the at least two or more sources generates seismic waves using a first sweep sequence and another of the at least two or more sources generates seismic waves using a second sweep sequence, and wherein the low-level cross-correlation is defined as a ratio between (i) a maximum of an auto-correlation of one of the first sweep sequence and the second sweep sequence, and (ii) a mean level of cross-correlation between the first sweep sequence and the second sweep sequence, acquiring seismic data R associated with the firing of the two or more sources;

recording a source signature $S_k$ for each of the two or more sources; and extracting, by applying a convolution model, a wave field $E_k$ associated with each of the two or more sources using the seismic data R and the source signatures $S_k$, wherein the convolution model considers that the seismic data R is a sum of convolutions of corresponding source signatures $S_k$ and wave fields $E_k$, a matrix S associated with the source signatures $S_k$ is a convolution operator, the wave fields $E_k$ are obtained by using the seismic data R and a matrix $S^T S$, which is a product of (i) a transpose $S^T$ of the matrix S and (ii) the matrix S, matrix $S^T S$ has non-diagonal terms that are cross-correlations of the source signatures $S_k$, and matrix $S^T S$ has diagonal terms that are autocorrelations of the source signatures $S_k$.

\* \* \* \* \*